April 15, 1924.
M. PURNELL
1,490,785
COMBINED SPOON AND STRAW HOLDER
Filed Nov. 3, 1922
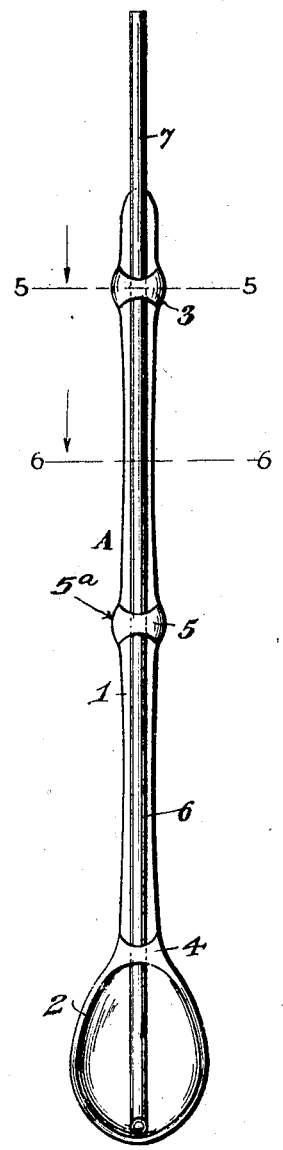
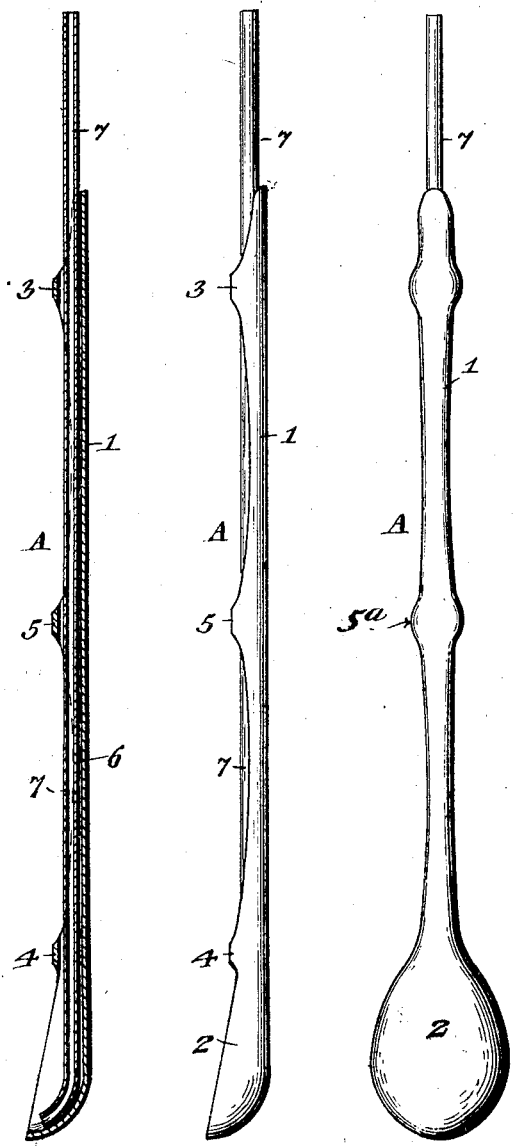
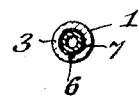
INVENTOR.
Miriam Purnell,
BY
Geo. P. Kimmel, ATTORNEY.

Patented Apr. 15, 1924.

1,490,785

UNITED STATES PATENT OFFICE.

MIRIAM PURNELL, OF MERRILLAN, WISCONSIN.

COMBINED SPOON AND STRAW HOLDER.

Application filed November 3, 1922. Serial No. 598,846.

*To all whom it may concern:*

Be it known that I, MIRIAM PURNELL, a citizen of the United States, residing at Merrillan, in the county of Jackson and State of Wisconsin, have invented certain new and useful Improvements in Combined Spoons and Straw Holders, of which the following is a specification.

This invention has reference to combined spoons and straw holders and is designed for use in eating ice cream or similar material and in imbibing drinks, needing both the spoon and the straw for the purpose.

In ice creams and similar desserts, a spoon alone is found to be insufficient due to the partially liquid condition of ice creams and the like and the need of a spoon in order to eat partially melted parts of the ice cream or other food served.

In accordance with the invention, there is provided a spoon bowl with an elongated stem in order to reach to the bottom of tall glasses in which the ice cream is often served.

It is frequently the experience that the ice cream becomes partially melted before being eaten and consequently the small-bowl spoons often employed are inefficient for the purpose.

In order to overcome the difficulty of eating the entire amount of ice cream or other dessert furnished, provision is made for the employment of a straw such as is used for liquid desserts, with further provision for discarding the straw when through with it and furnishing a new straw when the spoon is to be again used, whereby the usefulness of the combined spoon and straw is extended.

The invention will be best understood from a consideration of the following detailed description taken in connection with the accompanying drawings forming part of this specification, with the understanding that the invention is not confined to any strict conformity with the showing of the drawing, but may be changed and modified so long as such changes and modifications mark no material departure from the salient features of the invention as expressed in the appended claims.

In the drawings:—

Figure 1 is a plan view of a spoon equipped with a straw for use with it.

Fig. 2 is a longitudinal section from front to rear of the spoon with the straw equipment.

Fig. 3 is a side view of the spoon with the straw equipment.

Fig. 4 is a rear view of the spoon with the straw equipment.

Figs. 5 and 6 are sections on the lines 5—5 and 6—6, respectively, of Fig. 1.

Referring to the drawings, there is shown a spoon A having a handle 1 terminating at one end in a bowl 2 of shallow form such as is used in serving ice cream desserts and similar desserts.

The handle 1 is provided at intervals along its length with semi-circular cross pieces 3, 4, respectively, bridging the width of the handle and connecting the side edges thereof.

The bridge piece 4 is located at the junction of the bowl 2 with the handle 1, and the bridge piece 3 is arranged near the terminal portion of the handle, while an intermediate bridge piece 5 joins the sides of the handle between the bridge pieces 3 and 4. The several bridge pieces 3, 4 and 5 serve as yokes joining the side edges of the handle and preventing the latter from spreading or being discarded. The bridge pieces 3, 4 and 5 also serve to stiffen the handle, permitting it to be made of lighter gage material than would otherwise be the case and cheapening its construction so that it is possible to produce the spoons at a cheaper rate than would otherwise be the case. As shown at 5$^a$ the handle is offset at either side where the bridge pieces are joined to the handle.

As shown in Figs. 2 and 3 the longitudinal centers of the back of the bowl and handle are in the same plane, thus when the spoon is laid down its bowl will remain upright.

The bridge pieces or yokes 3, 4 and 5 also perform the function of guides and holding means for a straw 6 of conventional form, which straw may be long enough to reach from the interior of the bowl 2, beyond the rear end of the handle A, whereby the straw may be confined in the handle against accidental displacement and yet of such a character as will permit the replacing of the straw whenever desired, whereby the straw when having served its purpose may be discarded and replaced with a fresh straw.

The straws such as are furnished on the market are cheap enough to warrant being discarded when through with, the same as is done with the ordinary commercial straws when they have finished usefulness.

The straws which are used in connection with the spoons are of greater length than the handles of the spoons so as to reach beyond the rear end of the spoon handles, and to the front end of the bowls of the spoons and these straws are capable of being bent to a small extent without injury to them so as to hold their places in the spoons due to the pressure of the front ends of the straws in the curved bowl of the spoon.

The rear face of the handle 1 is formed with a longitudinal channel 7 adapted to seat the straw 6 and by forcing the front end of the straw into conformity with the curvature of the bowl of the spoon, the straw becomes anchored by the reaction of the yokes 3, 4 and 5 with the straw along its length, preventing the accidental loosening of the straw in the handle of the spoon.

The spoon may be made of metal or of some composition in accordance with the desired cost, while the straws, being of commercial form, may be separately purchased and replaced in the spoons as often as desired, at a minimum cost.

When the spoon is in use, it may be employed in the usual manner in the eating of ice cream and for any fruit served with the ice cream.

In order to obtain the liquid contents of the dish of ice cream, the straw is brought into service in the usual manner, so that in eating the ice cream, the more solid contents may be obtained by means of the spoon and the melted or other liquid contents may be obtained by suction applied to the straw.

The normal elasticity of the straw will permit the movement of the front end thereof close to the front of the bowl 2 thus permitting the user to reach the lowest levels of liquid contents in the dish or glass in which the ice cream is served.

What is claimed is:—

1. A spoon of the character described comprising, a bowl, a substantially elongated handle extending therefrom, and having a straw receiving groove in its upper surface opening into the bowl, and retaining members extending transversely of the handle and across said groove, for holding the straw in position.

2. A spoon of the character described comprising, a bowl, a substantially elongated handle extending therefrom and having a straw receiving groove in its upper surface opening into the bowl, and looped semi-circular retaining members extending transversely of the handle and across said groove, for holding the straw in position.

3. A spoon of the character described comprising, a bowl, a substantially elongated handle extending therefrom, the longitudinal center of the back of the bowl and handle being in the same plane, said handle having a straw receiving groove in its upper surface opening into the bowl, and looped semi-circular retaining members extending transversely of the handle and across said groove, for holding the straw in position.

In testimony whereof, I affix my signature hereto.

MIRIAM PURNELL.